Patented Aug. 5, 1952

2,606,185

UNITED STATES PATENT OFFICE 2,606,185

MONOAZO-DYESTUFFS OF THE PYRAZOLONE SERIES

Willy Widmer, Bottmingen, Alfred Fasciati, Basel, and Ernst Reich, Neuewelt, Munchenstein, Switzerland, assignors to Ciba Limited, Basel, Switzerland No Drawing. Application February 2, 1949, Serial No. 74,234. In Switzerland February 12, 1948

5 Claims. (Cl. 260—163)

According to this invention valuable new monoazo-dyestuffs of the pyrazolone series are made by coupling a diazo-compound of an amine of the general formula

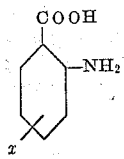

in which $x$ represents a sulfonamide group in paraposition to one of the groups —COOH and —NH$_2$, with a pyrazolone of the general formula

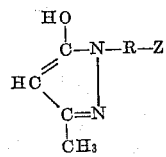

in which R represents an aromatic radical of the benzene series, and Z represents a sulfonamide group, and so choosing the starting materials that at least one of the two sulfonamide groups in the dyestuff molecule contains a hydrocarbon radical bound to the nitrogen atom, that the hydrocarbon radical or radicals of the two sulfonamide groups contains or contain together at most 9 carbon atoms, and that the starting materials contain no carboxyl or sulfonic acid groups apart from the single carboxyl group present in the diazo-component.

The 2-aminobenzene-1-carboxylic acid sulfonamides of the above formula used as starting materials may contain the sulfonamide group in the 4- or advantageously the 5-position. These compounds can be obtained by methods in themselves known, for example, by reacting a 2-chlorobenzene-1-carboxylic acid-4- or -5-sulfonic acid chloride with ammonia or a primary or secondary amine (appropriately chosen having regard to the foregoing requirements), and exchanging the chlorine atom in the resulting product for an —NH$_2$ group. 2-aminobenzene-1-carboxylic acid-4-sulfonamide can also be obtained by heating a 1-nitro-2-methylbenzene-5-sulfonamide in a medium containing an alkali hydroxide.

As examples of 2-aminobenzene-1-carboxylic acid-sulfonamides serving as starting materials and obtainable as described in the preceding paragraph there may be mentioned:

2- aminobenzene -5- sulfonamide -1- carboxylic acid,
2-aminobenzene -5- sulfonmethylamide -1- carboxylic acid,
2- aminobenzene - 5 - sulfon-isopropylamide -1- carboxylic acid,
2-aminobenzene-5-sulfon-n-propylamide-1- carboxylic acid,
2-aminobenzene -5- sulfon-n-butylamide-1-carboxylic acid,
2-aminobenzene -5- sulfon-di-isopropylamide-1- carboxylic acid,
2- aminobenzene -5- sulfon-di-n-butylamide -1- carboxylic acid,
2-aminobenzene -5- sulfon-n-hexylamide-1-carboxylic acid,
2- aminobenzene-5-sulfon-iso-amylamide-1-carboxylic acid,
2-aminobenzene -5- sulfon - cyclohexylamide-1- carboxylic acid,
2-aminobenzene -5- sulfon-benzylamide -1- carboxylic acid,
2- aminobenzene -5- sulfon-anilide-1-carboxylic acid,
2- aminobenzene -5- sulfon-N-methylanilide -1- carboxylic acid,
2-aminobenzene -4- sulfon-n-butylamide-1-carboxylic acid,
2-aminobenzene -4- sulfon - isopropylamide-1- carboxylic acid.

In the pyrazolones of the general formula

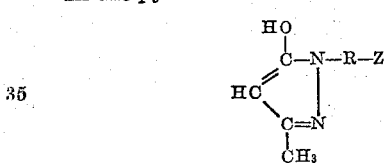

also used as starting materials, the radical R may contain further substituents such, for example, as alkyl groups, especially methyl groups, or halogen atoms such as chlorine, or nitro groups, alkoxy groups, etc. Such pyrazolones are obtained in known manner, for example, from ethyl acetoacetate and an arylhydrazine, which latter may be derived, for example, from one of the following amines: 3-aminobenzene-1-sulfonamide, 3-aminobenzene -1- sulfonmethylamide, 3-aminobenzene -1- sulfon-n-propylamide, 3-aminobenzene-1-sulfon-iso-propylamide, 3-aminobenzene-1-sulfon-n-butylamide, 3-aminobenzene -1- sulfon-diethylamide, 3-aminobenzene-1-sulfon-anilide, 3-aminobenzene -1- sulfon-N-ethyl-anilide, 3- amino -4- methylbenzene -1- sulfonamide, 3- amino-4-chlorobenzene-1-sulfonamide, 3-amino- 4-methylbenzene-1-sulfon-iso-propylamide, 3-amino-4-chlorobenzene-1-sulfon-ethylamide.

In accordance with this invention both the diazo-component and the pyrazolone contain a sulfon-amide group. At least one of these two sulfonamide groups contains a hydrocarbon radical bound to the nitrogen atom. However, more than one of the four substitution positions present in the sulfonamide groups taken together may be occupied by hydrocarbon radicals.

As will be seen from the list of starting materials given above, there come into consideration as hydrocarbon radicals normal or branched alkyl groups, cycloalkyl groups, aromatic radicals of the benzene series and aralkyl groups. The hydrocarbon radicals present in the two sulfonamide groups of both starting components may together contain up to 9 carbon atoms. Subject to this limitation the two components may be chosen as desired. One to four of the substitution positions present in the two sulfonamide groups may be occupied in any desired arrangement by hydrocarbon radicals and any remaining positions by hydrogen atoms.

Especially valuable monoazo dyestuffs are obtained by starting from pyrazolones of the general formula

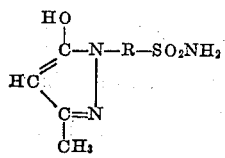

in which R represents an aromatic radical of the benzene series free from carboxyl and sulfonic acid groups, and advantageously represents the radical

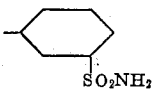

The use of this group of pyrazolones necessitates the presence of at least one hydrocarbon radical as a substituent at the nitrogen atom of the sulfonamide group in the diazo component. As diazo components in this connection there come into consideration, for example, amines of the general formula

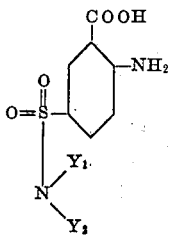

in which $Y_1$ represents an alkyl, cycloalkyl, aralkyl or aryl group and $Y_2$ represents hydrogen or an alkyl group.

There are advantageously used diazo components of the general formula

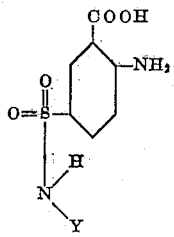

in which Y represents a hydrocarbon radical containing 3–6 carbon atoms, for example, a hexyl, cyclohexyl, amyl, phenyl or advantageously a butyl (for example, n-butyl) or propyl (for example, isopropyl) group.

The diazotization of the amines used as starting materials in the present invention may be carried out by methods in themselves known, and advantageously by the so-called indirect method, that is to say by uniting a solution which contains an alkali salt of the diazo component and also the necessary quantity of nitrite with a dilute solution of acid, especially hydrochloric acid, containing a quantity of acid in excess of the theoretical quantity.

In the present process the coupling is advantageously conducted in an alkaline medium. This may be carried out, for example, by dissolving the pyrazolone to be used as coupling component with the quantity of alkali hydroxide required for dissolution, and adding the excess of alkali required for the coupling reaction in the form of an alkali carbonate. If desired, the coupling may also be carried out with the addition of a neutral or basic solvent, for example, alcohol, pyridine, ethanolamine, etc.

The monoazo dyestuffs of the pyrazolone series obtainable by the present process are new. They are free from sulfonic acid groups, contain a single carboxyl group and correspond to the general formula

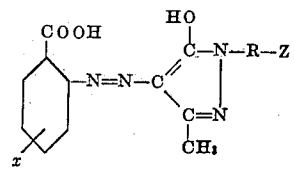

in which one unsubstituted carbon atom is between $x$ and the nearest of the other substituents.

R represents an aromatic radical of the benzene series and $x$ and Z each represent a sulfonamide group of which groups at least one contains a hydrocarbon radical bound to the nitrogen atom and the hydrocarbon radicals contain together at most 9 carbon atoms.

The new products can be used for dyeing or printing various materials, principally those of animal origin, such as wool, silk and leather, and artificial fibers of superpolyamides or superpolyurethanes. Especially valuable results are obtained by treating the dyestuffs obtainable by the present process with agents yielding metal. This treatment may be carried out in known manner in substance or in the dyebath or on the fiber. Thus the metallization may be carried out in substance, for example, with an agent yielding chromium in a weakly acid, neutral or alkaline medium, if desired in the presence of suitable additions, for example, aromatic ortho-oxy-carboxylic acids, or bases, organic solvents such as alcohols, or further additions which assist the formation of the complexes, and under atmospheric or superatmospheric pressure. The metallization in the dyebath or on the fiber may also be carried out in known manner, for example, with the addition of an alkali chromate and an ammonium salt.

By the present process there are usually obtained dyestuffs which are valuable in that they dye wool by the usual chroming processes yellow tints which are very fast, especially to light. The dyestuffs are suitable above all for dyeing by processes in which the dyeing is conducted by the single bath process with a solution containing the dyestuff, an alkali chromate and ammonium sulfate. Such processes are known, for example, under the names "Synchromate Process" and "Metachrome Process." The dyestuffs of the present invention are therefore distinguished from the known products described in U. S. Patent No. 1,821,938 which are of similar constitution, but contain a sulfonic acid group in the radical of the coupling component and are not suitable for dyeing by the single bath chroming process.

The following examples illustrate the invention, the parts being by weight:

*Example 1*

30.6 parts of 2-aminobenzene-5-sulfon-N-methyl-anilide-1-carboxylic acid are dissolved in 300 parts of water with the addition of 8 parts of anhydrous sodium carbonate. After the introduction of 7 parts of sodium nitrite, the solution is run into a mixture consisting of 40 parts of hydrochloric acid of 30 per cent. strength and sufficient ice to keep the reaction temperature at about 10–15° C. during the diazotization, and the whole is stirred until diazotization is complete. The suspension of the diazo-compound is coupled with a solution of 25.3 parts of 1-(3'-sulfonamido)-phenyl-3-methyl-5-pyrazolone in 200 parts of water, 6 parts of sodium hydroxide and 25 parts of anhydrous sodium carbonate at 5–10° C. The whole is stirred until coupling is complete and the dyestuff is separated by filtration. It corresponds to the formula

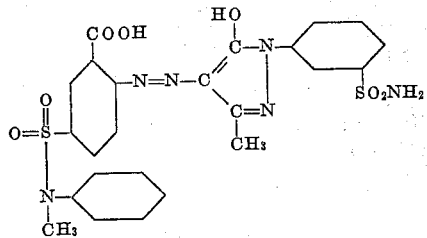

When dry it is an orange-yellow substance which dissolves in hot water and hot sodium carbonate solution with a yellow coloration, and dyes wool from an acid bath yellow tints which when after-chromed become brownish yellow and very fast to washing, fulling and light. The dyestuff is excellently suited for dyeing by the single bath chroming process.

*Example 2*

27.2 parts of 2-aminobenzene-5-sulfon-n-butylamide-1-carboxylic acid are dissolved in 300 parts of water with the addition of 8 parts of anhydrous sodium carbonate. After introducing 7 parts of sodium nitrite, the solution is run into a mixture consisting of 40 parts of hydrochloric acid of 30 per cent. strength and sufficient ice to keep the reaction temperature at about 10–15° C. during the diazotization, and the whole is stirred until diazotization is complete. The suspension of the diazo-compound is coupled with a solution of 25.3 parts of 1-(3'-sulfonamido) - phenyl-3-methyl-5-pyrazolone in 200 parts of water, 6 parts of sodium hydroxide and 25 parts of anhydrous sodium carbonate at 5–10° C. The whole is stirred until coupling is complete, and the dyestuff is separated by filtration. It corresponds to the formula

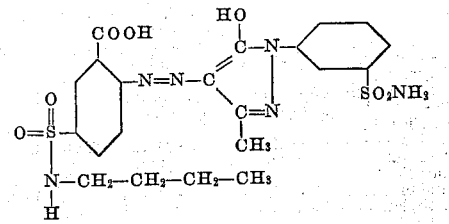

When dry it is an orange-yellow substance which dissolves in hot water and in hot sodium carbonate solution with a yellow coloration, and dyes wool from an acid bath yellow tints which when after-chromed become brownish yellow and very fast to washing, fulling and light. The dyestuff is excellently suited for dyeing by the single bath chroming process.

*Example 3*

29.2 parts of 2-aminobenzene-5-sulfonanilide-1-carboxylic acid are dissolved in 300 parts of water with the addition of 8 parts of anhydrous sodium carbonate. After the addition of 7 parts of sodium nitrite the solution is run into a mixture consisting of 40 parts of hydrochloric acid of 30 per cent. strength and sufficient ice to keep the reaction temperature at about 10–15° C. during the diazotization, and the whole is stirred until diazotization is complete. The suspension of the diazo-compound is coupled with a solution of 25.3 parts of 1-(3'-sulfonamido)-phenyl-3-methyl-5-pyrazolone in 200 parts of water, 6 parts of sodium hydroxide and 25 parts of anhydrous sodium carbonate at 5–10° C. The whole is stirred until coupling is complete and the dyestuff is separated by filtration. It corresponds to the formula

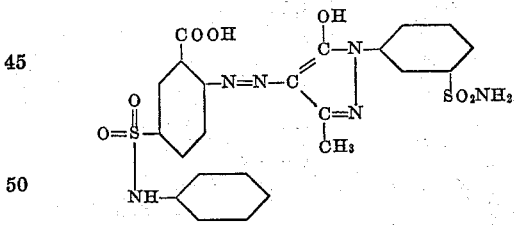

The dyestuff is then stirred in 300 parts of water, and a sufficient quantity of sodium hydroxide solution of 30 per cent. strength is added to cause complete dissolution. The solution is evaporated to dryness under reduced pressure. There is obtained an orange-yellow substance which dissolves well in cold water and dyes wool from an acid bath yellow tints which when after-chromed become brownish yellow and very fast to washing, fulling and light. The dyestuff is excellently suited to dyeing by the single bath chroming process.

By coupling the diazo-components given in column 1 of the following table (in the manner described in the foregoing examples) with their respective coupling components given in column 2, there are likewise obtained dyestuffs which yield yellow tints on wool by the after-chroming process or by the single bath chroming process. Among these dyestuffs those which contain in the phenyl radical of the pyrazolone in addition to the sulfonamide group, a further substituent (Cl, CH₃) in ortho-position to the linkage to the pyrazolone ring yield somewhat less reddish tints.

1. Diazo-component:

- 2 - aminobenzene - 4 - sulfon - n - butylamide - 1 - carboxylic acid
- 2 - aminobenzene - 5 - sulfon - iso - propylamide - 1 - carboxylic acid
- 2 - aminobenzene - 5 - sulfon - diethylamide - 1 - carboxylic acid
- 2 - aminobenzene - 5 - sulfon - diethylamide - 1 - carboxylic acid
- 2 - aminobenzene - 5 - sulfon - amide - 1 - carboxylic acid
- 2 - aminobenzene - 5 - sulfon - amide - 1 - carboxylic acid
- 2 - aminobenzene - 5 - sulfon - anilide - 1 - carboxylic acid
- 2 - aminobenzene - 5 - sulfon - anilide - 1 - carboxylic acid
- 2 - aminobenzene - 5 - sulfon - cyclo - hexylamide - 1 - carboxylic acid
- 2 - aminobenzene - 5 - sulfon - N - methylanilide - 1 - carboxylic acid 2. Coupling component: The 3 - methyl - 5 - pyrazolone derived from—

- 2 - Aminobenzene - 1 - sulfonamide
- 3 - aminobenzene - 1 - sulfonamide
- 3 - aminobenzene - 1 - sulfonamide
- 3 - aminobenzene - 1 - sulfonmethylamide
- 3 - aminobenzene - 1 - sulfon - N - ethyl - anilide
- 3 - aminobenzene - 1 - sulfondiethylamide
- 4 - chloro - 3 - aminobenzene - 1 - sulfonamide
- 4' - methyl - 3' - aminobenzene - 1 - sulfonamide
- 3 - aminobenzene - 1 - sulfonamide
- 4 - aminobenzene - 1 - sulfonamide The dyestuffs obtained by coupling the diazo-components given in column 1, supra, with their respective coupling components given in column 2 correspond, in order, to the following formulae:

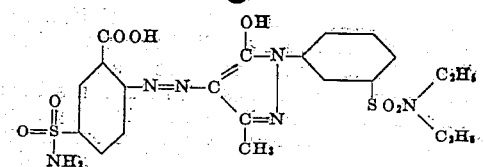

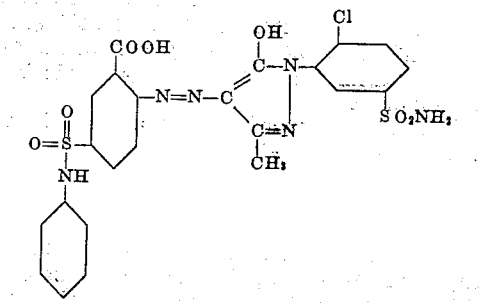

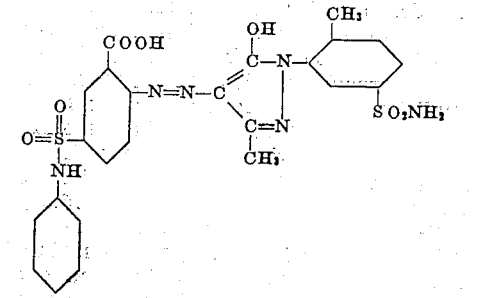

and

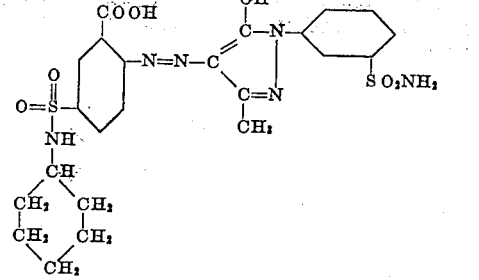

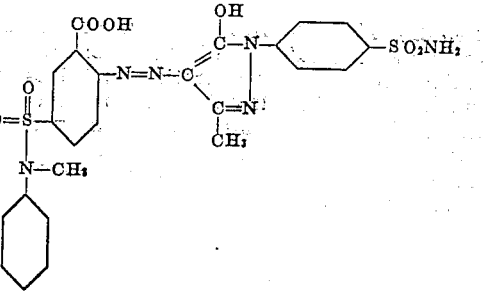

Example 4

100 parts of well wetted wool are entered into a dyebath at 60° C. which contains in 4000 parts of water 2 parts of the dyestuff obtainable by coupling diazotized 2-aminobenzene-5-sulfon-isopropylamide-1-carboxylic acid with 1-(3'-sulfonamido)-phenyl - 3 - methyl - 5 - pyrazolone, 4 parts of acetic acid of 40 per cent. strength and 10 parts of crystalline sodium sulphate. The temperature is raised to the boil in the course of 30 minutes and dyeing is carried on at the boil for 45 minutes. 5 parts of sulphuric acid at 10 per cent. strength are then added, and dyeing is continued for a further 15 minutes. The dyebath is then cooled to about 70° C., 1 part of potassium bichromate is added, the whole is again brought to the boil, and chroming is carried on at the boil for 40 minutes. The wool is dyed a fast yellow tint.

*Example 5*

A dyebath is prepared with 1.5 parts of potassium chromate, 1.5 parts of ammonium sulphate, 10 parts of crystalline sodium sulphate and 2 parts of the dyestuff obtained as described in Example 2. 100 parts of well wetted wool are entered into the dyebath at 60° C., the temperature is raised to the boil in the course of 30 minutes, and boiling is continued for 45 minutes. 0.5 part of acetic acid of 40 per cent strength is then added and the whole is boiled for a further 45 minutes. The wool is dyed a very fast yellow tint.

What we claim is:

1. A monoazo-dyestuff of the pyrazolone series, which is free from sulfonic acid groups, contains a single carboxyl group and corresponds to the general formula

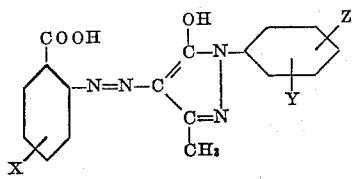

in which one unsubstituted carbon atom is between X and the nearest of the other substituents, Y represents a member of the group consisting of a hydrogen atom, a chlorine atom and a methyl group, and X and Z each represent a sulfonamide group, of which groups at least one contains a hydrocarbon radical bound to the nitrogen atom and the hydrocarbon radicals contain together 3 to 9 carbon atoms.

2. A monoazo-dyestuff of the pyrazolone series which is free from sulfonic acid groups, contains a single carboxyl group, corresponds to the general formula

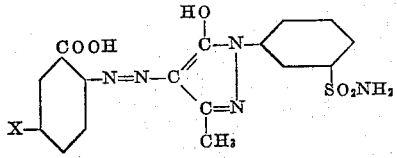

in which X represents a sulfonamide group, which contains at least one hydrocarbon radical bound to the nitrogen atom but contains 3 to 9 carbon atoms.

3. The monoazo dyestuff of the formula

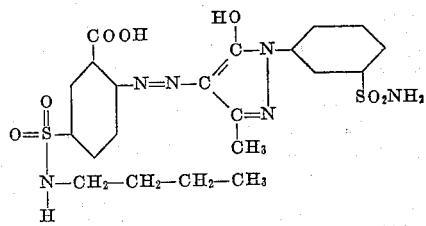

4. The monoazo dyestuff of the formula

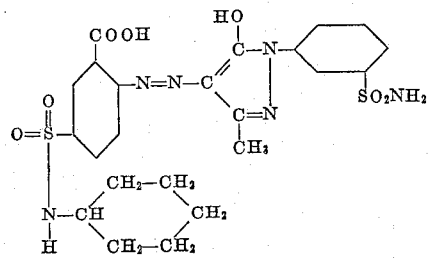

5. The monoazo dyestuff of the formula

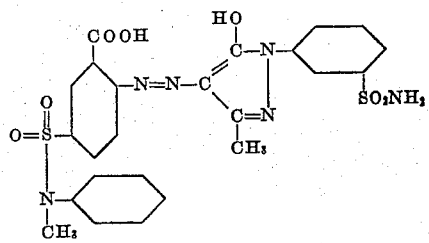

WILLY WIDMER.
ALFRED FASCIATI.
ERNST REICH.

REFERENCES CITED

The following references are of record in the file of this patent:

UNITED STATES PATENTS

| Number | Name | Date |
|---|---|---|
| 1,821,938 | Hentrich et al. | Sept. 8, 1931 |
| 1,908,571 | Straub et al. | May 9, 1933 |

FOREIGN PATENTS

| Number | Country | Date |
|---|---|---|
| 190,034 | Switzerland | June 16, 1937 |
| 189,041 | Switzerland | Apr. 16, 1937 |
| 210,605 | Switzerland | Oct. 1, 1940 |